United States Patent
Mota Lopez et al.

(10) Patent No.: US 7,281,671 B2
(45) Date of Patent: Oct. 16, 2007

(54) WASHER FLUID SQUIRT DEVICE FOR MOTOR VEHICLE WINDSCREEN WASHER JETS

(75) Inventors: Miguel Mota Lopez, Rubi (ES); Juan Elvira Peralta, Rubi (ES)

(73) Assignee: Fico Transpar, S.A., Barcelona (ES)

( * ) Notice: Subject to any disclaimer, the term of this patent is extended or adjusted under 35 U.S.C. 154(b) by 305 days.

(21) Appl. No.: 10/538,294

(22) PCT Filed: Nov. 26, 2003

(86) PCT No.: PCT/EP03/13301

§ 371 (c)(1), (2), (4) Date: Jun. 10, 2005

(87) PCT Pub. No.: WO2004/056627

PCT Pub. Date: Jul. 8, 2004

(65) Prior Publication Data

US 2006/0038037 A1    Feb. 23, 2006

(30) Foreign Application Priority Data

Dec. 20, 2002    (EP) ................................ 200202937

(51) Int. Cl.
| | |
|---|---|
| B05B 1/10 | (2006.01) |
| B05B 1/32 | (2006.01) |
| B05B 1/04 | (2006.01) |
| B60S 1/46 | (2006.01) |
| A62C 31/02 | (2006.01) |

(52) U.S. Cl. ............... 239/284.1; 239/284.2; 239/457; 239/589; 239/594; 239/599

(58) Field of Classification Search ............ 239/284.1, 239/284.2, 457, 589, 594, 599
See application file for complete search history.

(56) References Cited

U.S. PATENT DOCUMENTS

| 4,721,251 A * | 1/1988 | Kondo et al. ............... 239/412 |
| 4,865,059 A | 9/1989 | Levé |
| 5,857,624 A * | 1/1999 | Lee ........................ 239/284.1 |
| 5,975,431 A | 11/1999 | Harita et al. |
| 6,082,636 A | 7/2000 | Yoshida et al. |
| 6,464,150 B1 * | 10/2002 | Zimmer et al. .......... 239/284.1 |
| 6,575,386 B1 * | 6/2003 | Thurber et al. ............. 239/418 |

FOREIGN PATENT DOCUMENTS

| FR | 2 726 204 | 5/1996 |
| FR | 2 803 542 | 7/2001 |
| GB | 2 062 452 | 5/1981 |
| WO | WO 02/26537 | 4/2002 |
| WO | WO 02/060589 | 8/2002 |

* cited by examiner

Primary Examiner—Davis Hwu
(74) Attorney, Agent, or Firm—Sughrue Mion, PLLC

(57) ABSTRACT

The device is comprised of a jet body (2) and a body for a fan shaped squirt (3) which can be mutually coupled. The squirt body (3) has a squirting orifice (9) which comprises four consecutively connected portions, of which, in the washer fluid flow direction, the first portion (10) is conical and in decreasing section; the second section portion (11) forms a spherical cap in decreasing section; the third portion (12) is in rectangular cross-section and in increasing section; and the fourth portion (15) is in rectangular cross-section in decreasing section in said flow direction and configures a convex outlet edge (16), which is surrounded by an outer lateral squirting groove.

2 Claims, 2 Drawing Sheets

WASHER FLUID SQUIRT DEVICE FOR MOTOR VEHICLE WINDSCREEN WASHER JETS

TECHNICAL SECTOR OF THE INVENTION

The present invention relates to a washer fluid squirt device for motor vehicle windscreen washer jets.

CROSS-REFERENCE TO RELATED APPLICATION

This application is a 371 of PCT/EP2003/013301 filed Nov. 26, 2003; the disclosure of which is incorporated herein by reference.

BACKGROUND TO THE INVENTION

Many embodiments of washer fluid squirt devices for motor vehicle windscreens are known. Essentially, said devices are comprised of a jet body and a squirt body, capable of being mutually coupled, wherein the jet body is equipped with means for its mounting onto the vehicle bodywork and means for the connection of a washer fluid pipe from a tank, and the squirt body is equipped with means for squirting washer fluid onto the windscreen and means for allowing said squirt to be directed in order to optimise the action of the wiper blades.

The patent ES P 200100234, by the same applicant, discloses a washer fluid squirt device which, in essence, comprises a jet body and a unit for a fan-shaped squirt of washer fluid, consisting of a first squirt body and a second squirt body, capable of being mutually coupled and configuring two equal conduits of washer fluid which originate in an inlet chamber and converge in an outlet chamber.

The patent FR 2 803 542 discloses a water jet for motor vehicle windscreen washer fluid, essentially comprised of a jet body and a body for a fan-shaped squirt of washer fluid, equipped with a rectangular section conduit, wherein there is a longitudinal centred rib, said conduit originating in a transversally cylindrical inlet chamber.

The U.S. Pat. No. 2,726,204 discloses a jet for cleaning motor vehicle windscreens which is essentially comprised of a jet body and a body for a fan-shaped squirt of washer fluid, equipped with a circular section conduit, the outer end of which has a transversally arranged V-shaped outlet aperture.

EXPLANATION OF THE INVENTION

The washer fluid squirt device for motor vehicle windscreen washer jets object of the invention, Is comprised of a jet body and a body for a fan-shaped squirt of washer fluid provided with a squirting orifice and coupled to the jet body, in such a way that it can be rotated around its longitudinal axis.

The device of the invention Is characterised in that the squirting orifice comprises four conduit portions which are consecutively connected without interruption, thus defining a conduit axis and in such a way that its longitudinal section is symmetrical with regard to a theoretical main transverse plane, of which the first portion, which is the innermost one, is conical and in progressively decreasing section in the flow direction of the washer fluid; the second portion forms a spherical cap of decreasing section in the flow direction of the washer fluid; the third portion is in rectangular cross-section and in progressively increasing section in the flow direction of the washer fluid and when connecting with the second portion configures a rectangular window whose end sides are situated inwardly with regard to the tangency determined by the connection of the first portion with the second portion; and the fourth portion is in rectangular cross-section in decreasing section in the flow direction of the washer fluid, which configures without interruption, a convex outlet edge for the washer fluid and wherein the squirt body is equipped with a lateral squirting groove, perpendicularly arranged as regards the conduit axis of the squirting orifice, which surrounds the exit edge of the squirting orifice and the bottom part thereof is below the level corresponding to the connection of the third portion with the fourth portion of the squirting orifice.

It is also characteristic of the device of the invention that the lateral squirting groove has a cross-section whose outline comprises a first concave portion that connects tangentially with the convex exit edge of the squirting orifice and a second straight portion that connects tangentially with the first concave portion, forming an outwardly directed angularity.

The previously described features of the device of the invention provide solutions to problems which the known embodiments of squirt devices, such as the aforementioned create, most prominent among said problems being the uniform distribution of washer fluid in the arc shaped by the fan-shaped squirt; the plugging of the sides of the squirt aperture, caused by low temperatures, resulting in the washer fluid being squirted onto one place on the windscreen as a single jet; and high production costs. The characteristics of the device of the invention provide the advantages which are set out in detail below. The fan-shaped squirting of washer fluid is done by concentrating a greater amount of washer fluid in the outer areas of the fan, thus enhancing the driver's vision during the spraying of the windscreen, unlike the known embodiments wherein the fluid distribution Is uniform throughout the entire fan-shaped squirt; the washer fluid is squirted by means of an outlet aperture which is large enough to ensure a fan-shaped squirt at low temperatures, unlike the known embodiments, wherein the outlet aperture leads to the plugging of its lateral areas, and thus results in the loss of the fan-shaped squirt of liquid; and, the fact that the squirt body is made up of a single part reduces production costs in relation to those embodiments requiring two or more parts in order to attain the fan-shaped squirting of washer fluid.

BRIEF DESCRIPTION OF THE DRAWINGS

Illustrated in the attached drawings, by way of non-limiting example, is a form of embodiment of the washer fluid squirt device for motor vehicle windscreen washer jets object of the invention. In said drawings.

DETAILED DESCRIPTION OF THE DRAWINGS

Figure 1:
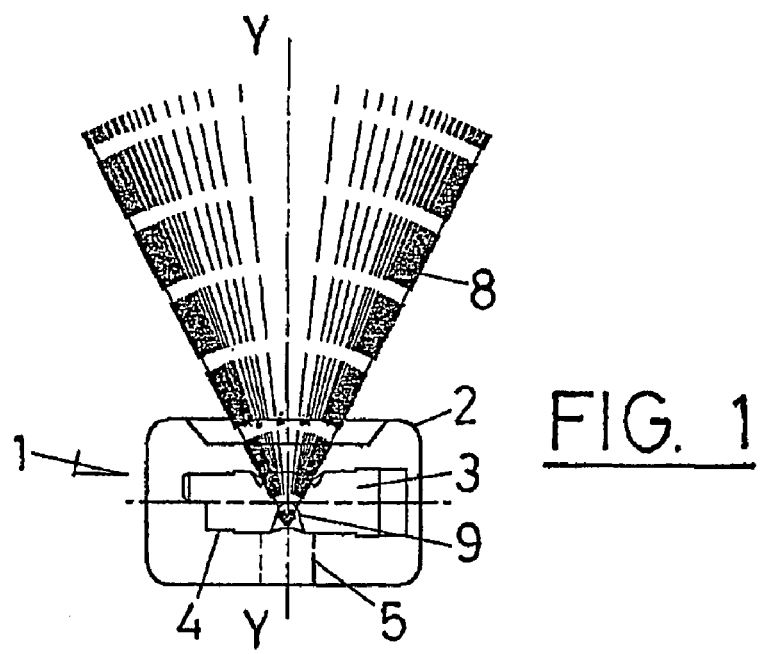
FIG. 1 is a diagrammatic view of the squirt device of the invention.

In FIG. 1, the washer fluid squirt device 1 for motor vehicle windscreen washer jets object of the invention is represented and which, as an embodiment example, is described below. The squirt device 1 essentially comprises a jet body 2, which is basically parallelepiped and adapted to each specific application and an essentially cylindrical-shaped body 3 for a fan-shaped squirting of washer fluid, both being mutually coupled. The jet body 2 is provided with a slot 4, adapted to snugly receive the squirt body 3 and In such a way that the latter may be rotated around its longitudinal axis, with means for fixing to the vehicle bodywork, not shown, and with means for connecting a washer fluid pipe, which are also not shown, as well as a conduit 5, represented by dashes, which connects said washer fluid pipe hydraulically with the slot 4.

Figure 2:
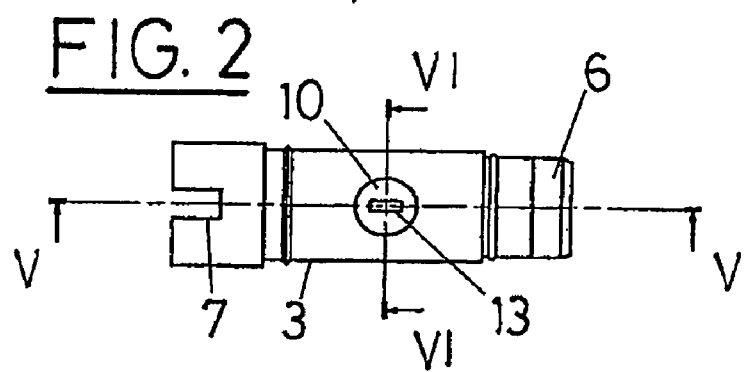
FIGS. 2, 3 and 4 are respective side views of the squirt body of the squirt device of the invention.
Figure 3:
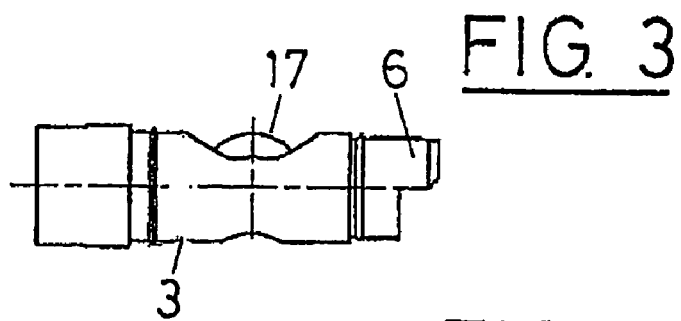
Figure 4:
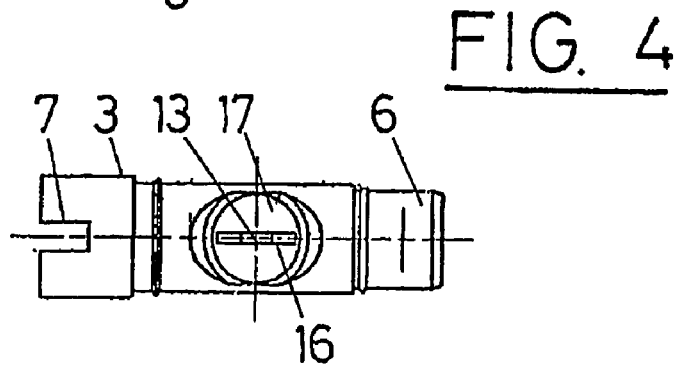

In FIGS. 2, 3 and 4, it can be appreciated that the squirt body 3 is provided with positioning means with regard to the jet body 2, which comprise a protuberance 6 at one of its ends and a groove 7 at the other end, the protuberance 6 being adapted for housing in a corresponding cavity, not shown, of the slot 4 of the jet body 2, intended to limit the rotation of the squirt body 3 around its longitudinal axis, whereas the groove 7 is adapted for receiving a tool, such as the blade end of a screwdriver, enabling the user to rotate the squirt body 3, thus determining the area in which the washer fluid squirted in a fan-shape 8 reaches the vehicle windscreen.

Figure 5:
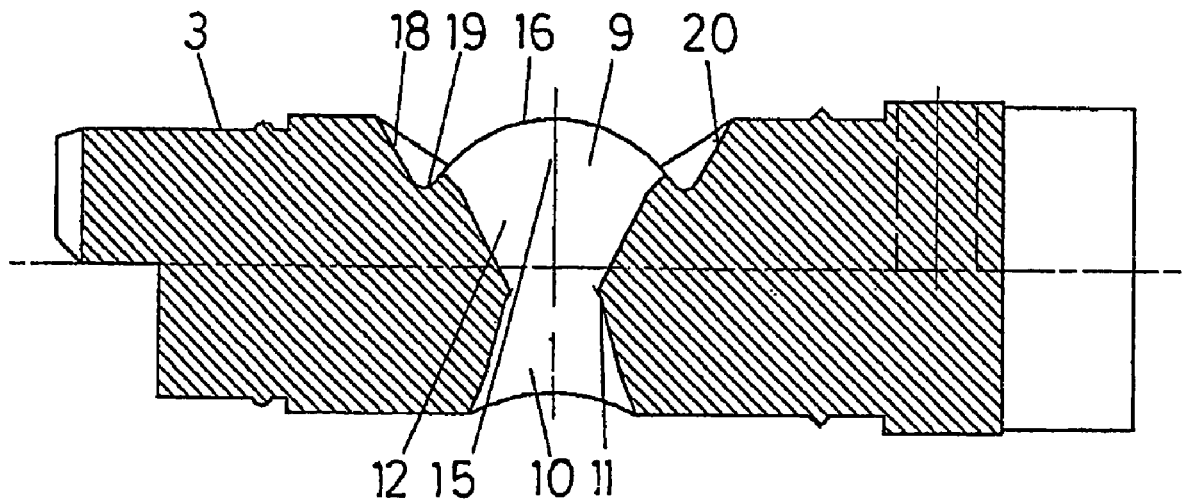
FIG. 5 is the view corresponding to section V-V of FIG. 2.
Figure 6:
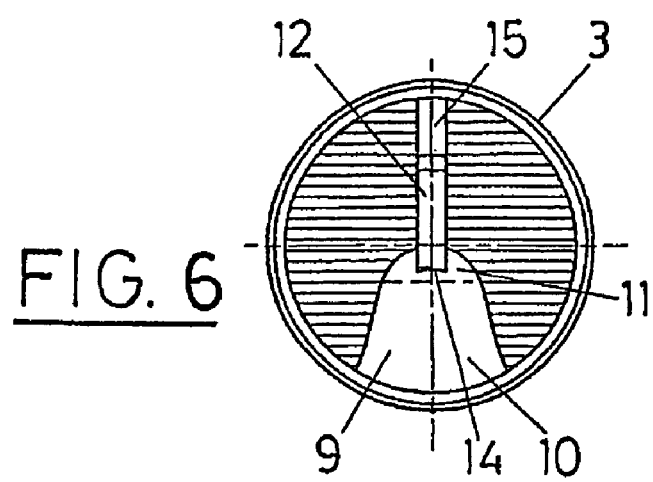
FIG. 6 is the view corresponding to section VI-VI of FIG. 2.

With reference to FIGS. 5 and 6, it can be appreciated that the squirt body 3 is equipped with a squirting orifice 9, arranged transversally and in such a way that, as FIG. 1 shows, it remains facing the conduit 5 that connects hydraulically with said washer fluid pipe. FIG. 5 shows in detail that the squirting orifice 9 comprises four well-defined conduit portions, which are connected consecutively and whose longitudinal section is symmetrical with regard to a theoretical main transverse plane of the squirt body 3. The first portion 10, that which is facing the conduit 5 of the jet body 2, is conical and has a progressively decreasing section in the flow direction of the washer fluid; the second portion 11 forms a spherical cap with decreasing section in the flow direction of the washer fluid; the third portion 12 has a rectangular cross-section and progressively increasing section in the flow direction of the washer fluid, configuring, in its connection with the second portion 11, a rectangular window 13, represented in FIGS. 2 and 4, whose end sides 14, represented in FIG. 6, are situated inwardly with regard to the tangency determined by the connection of the first portion 10 with the second portion 11, indicated in FIG. 6 by means of a dashed line; and the fourth portion 15 has a rectangular cross-section in decreasing section in the flow direction of the washer fluid, this fourth portion 15 determining a large outwardly convex outlet edge 16 which, in this embodiment example of the device of the invention, confines itself to a circumferential edge over a spherical cap 17 which configures the lateral surface of the squirt body 3, represented in FIGS. 3 and 4.

The squirt body 3 has a lateral squirting groove 18, shown in section in FIG. 5, perpendicularly arranged with regard to the longitudinal axis of the squirting orifice 9 and which surrounds the outlet edge 16, the squirt groove 18 having a cross-section whose outline comprises a first concave portion 19 which connects tangentially at one end with the convex edge 16 of the squirting orifice 9, and by one end connects with a second straight portion 20 that forms an outwardly directed angularity, all adapted so that the bottom part of the lateral squirt groove 18 is situated below the level corresponding to the connection of the third portion 12 with the fourth portion 15 of the squirting orifice 9.

The fan-shaped squirting of the washer fluid by the squirting device of the invention is represented in FIG. 1, wherein it can firstly be appreciated that the squirting of washer fluid onto the vehicle windscreen is symmetrical with regard to a vertical plane Y-Y, and secondly, that it results in a greater concentration of washer fluid at the ends of the fan-shaped squirt, and this, as has been pointed out earlier, enhances the driver's vision during the spraying of the windscreen.

The invention claimed is:

1. Washer fluid squirt device for motor vehicle windscreen washer jets object of the invention, comprised of a jet body (2) and a body (3) for a fan-shaped squirt of washer fluid equipped with a squirting orifice (9) and coupled to the jet body (2), in such a way that it can be rotated around its longitudinal axis, characterised in that the squirting orifice (9) comprises four conduit portions which are consecutively connected without interruption, thus defining a conduit axis and in such a way that its longitudinal section is symmetrical with regard to a theoretical main transverse plane, of which the first portion (10), which is the innermost one, is conical and in progressively decreasing section in the flow direction of the washer fluid; the second portion (11) forms a spherical cap in decreasing section in the flow direction of the washer fluid; the third portion (12) is in rectangular cross-section and in progressively increasing section in the flow direction of the washer fluid and when connecting with the second portion (11) configures a rectangular window (13) whose end sides (14) are situated inwardly with regard to the tangency determined by the connection of the first portion (10) with the second portion (11); and the fourth portion (15) is in rectangular cross-section in decreasing section in the flow direction of the washer fluid, which configures without interruption a convex exit edge (16) of the washer fluid and in that the squirt body (3) is provided with a lateral squirting groove (18) perpendicularly arranged as regards the conduit axis of the squirting orifice (9), which surrounds the exit edge (16) of the squirting orifice (9) and the bottom part of which is below the level corresponding to the connection of the third portion (12) with the fourth portion (15) of the squirting orifice (9).

2. Squirt device according to claim 1, characterised in that the lateral squirting groove (18) has a cross-section whose outline comprises a first concave portion (19) that connects tangentially with the convex exit edge (16) of the squirting orifice (9) and a second straight portion (20) that connects tangentially with the first concave portion (19), forming an outwardly orientated angularity.

* * * * *